Oct. 6, 1964

F. J. LYLE 3,151,916

STOP CONSTRUCTION

Filed Nov. 27, 1961

INVENTOR.
Frederick J. Lyle,
BY
Byron, Hume, Groen & Clement
Attorneys.

Oct. 6, 1964  F. J. LYLE  3,151,916
STOP CONSTRUCTION
Filed Nov. 27, 1961  2 Sheets-Sheet 2
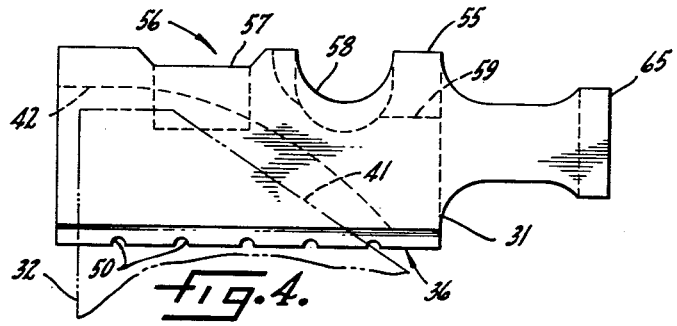
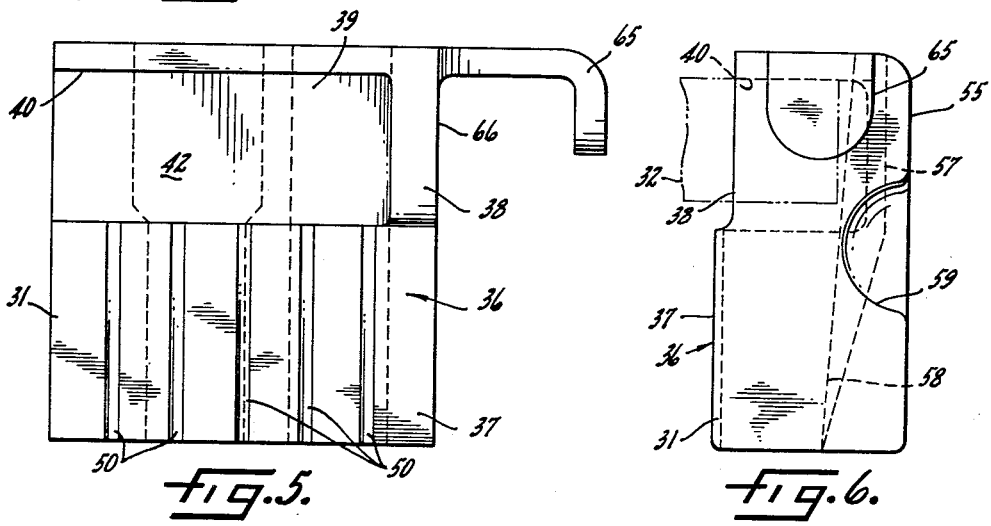
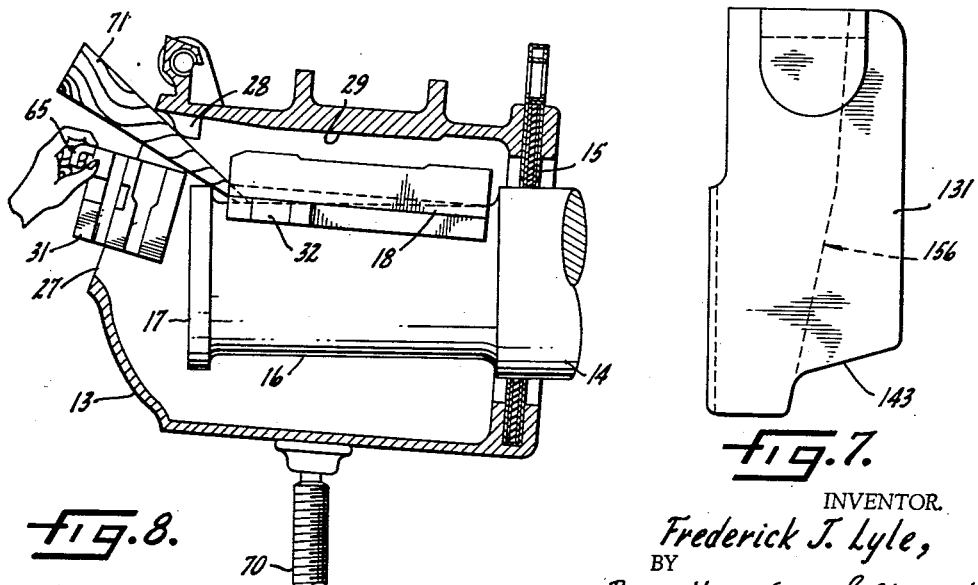
INVENTOR.
Frederick J. Lyle,
BY
Byron, Hume, Groen & Clement
Attorneys.

United States Patent Office 3,151,916
Patented Oct. 6, 1964

3,151,916
STOP CONSTRUCTION
Frederick J. Lyle, Richmond, Va., assignor to Spring Packing Corporation, Chicago, Ill., a corporation of Illinois
Filed Nov. 27, 1961, Ser. No. 154,965
16 Claims. (Cl. 308—38)

This invention relates in general to railroad equipment and more particularly to a journal stop arrangement.

It is an object of this invention to provide a new and improved journal stop arrangement for restricting the movement of an axle in a journal box.

It is another object to provide a journal stop arrangement which limits the longitudinal movement of an axle in a journal box relative to a railroad car.

It is still another object to provide a journal stop arrangement which substantially prevents journal and bearing displacement and effectively eliminates hot boxes caused by packing waste slipping between a displaced journal and bearing.

It is yet another object to provide a journal stop arrangement including unitary journal stops which are easily insertable into and removable from operative relationship with a journal in a journal box.

It is a further object to provide journal stops of the aforedescribed character which distribute the shock loads transmitted between the journal and the journal box more evenly than generally similar constructions presently utilized.

It is yet a further object to provide a journal stop arrangement which absorbs a great portion of the shock loads developed within a journal box without transmitting high shock loading to bearing structure or to the journal box itself.

It is another object to provide a journal stop arrangement which stabilizes a lubricating waste or pad associated with the journal box.

It is still another object to provide unitary journal stops which can be inserted in and removed from operative relationship within a journal box without maintenance personnel inserting their hands far inside the box and subjecting them to potential harm.

It is yet another object to provide a journal stop arrangement which can be utilized to remove a bearing member from the bearing box, when so desired, without reaching into the journal box to grasp the bearing member.

It is still a further object to provide a journal stop arrangement which is readily adaptable for use with conventionally constructed journal boxes presently in use in the railroad industry.

It is yet another object to provide a journal stop arrangement which is simpler and less expensive than journal stop arrangements presently utilized.

The above and other objects are realized in accordance with the present invention by providing a new and improved journal stop arrangement for restricting the movement of an axle relative to a journal box.

Briefly, the invention contemplates the utilization of two identically constructed, unitarily formed journal stops which cooperate with the vertically disposed walls of a journal box and with the axle journal itself to substantially limit longitudinal movement of the axle in the journal box relative to the railroad car. The stops cooperate with and are supported by structure conventionally associated with a journal box and axle journal assembly and are effective to stabilize this structure, which includes the bearing and bearing wedge, for example, during shock producing operations such as "humping" or braking, for example.

The journal stops are freely removable from and insertable into operative relationship with the journal box and the axle journal as well as normally being freely movable relative to the box and the journal in operative relationship. In one aspect of the present invention, the journal stop arrangement is adapted for use in a conventional journal box which incorporates waste retainer ribs of well known construction. In another aspect of the invention, the journal stop arrangement is adapted for use in a conventional journal box which does not incorporate waste retaining rib structure.

The invention, both as to its organization and method of operation, taken with further objects and advantages thereof, will best be understood by reference to the following description taken in connection with the accompanying drawings, in which:

FIGURE 4 is a top plan view of a journal stop embodying the features of the present invention;

FIGURE 5 is a side elevational view of the journal stop shown in FIGURE 4;

FIGURE 6 is a front elevational view of the journal stop shown in FIGURES 4 and 5;

FIGURE 7 is a front elevational view of an alternative form of a journal stop embodying the features of the present invention being removed from operative relationship (or inserted) within a journal box; and FIGURE 8 is a view similar to FIGURE 2 showing the removal of a journal stop from the journal box.

Figure 1:
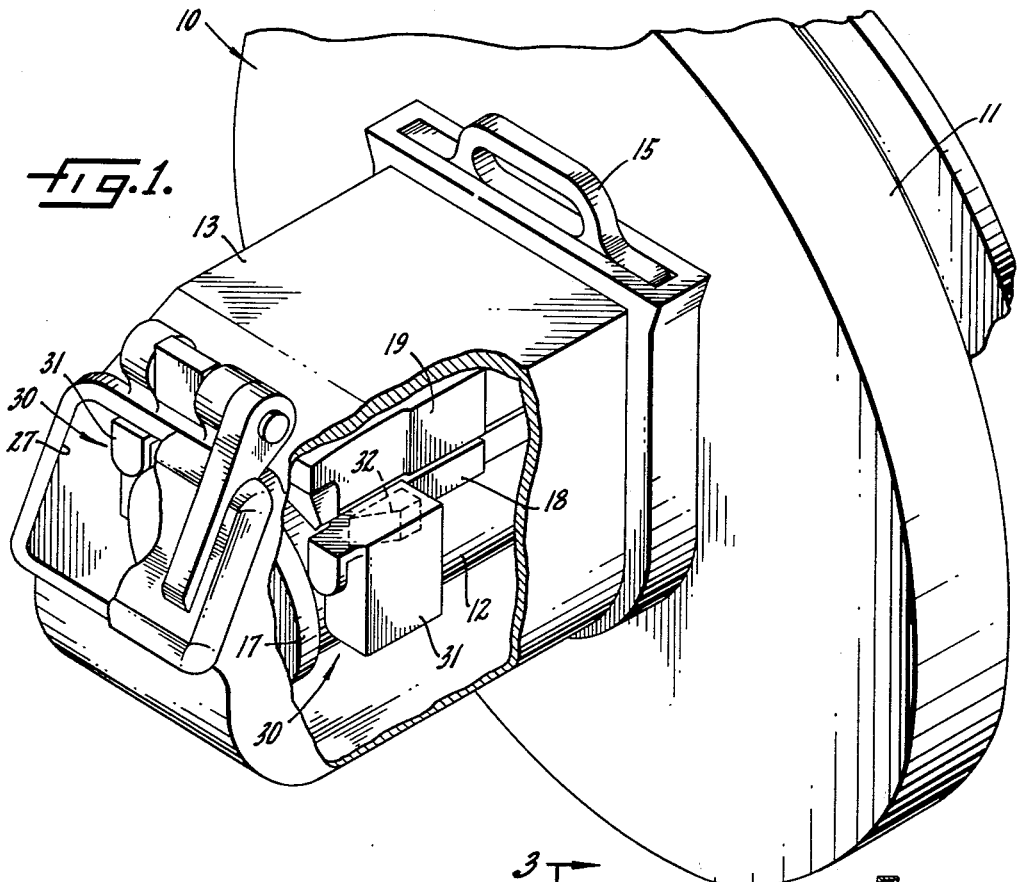
FIGURE 1 is a fragmentary perspective view of a portion of a railway truck-side comprising a flanged wheel, axle, and journal box, and including a journal stop arrangement embodying the features of the present invention.

Referring now to the drawings and particularly to FIGURE 1, a portion of a conventional railway truck-side is shown generally at 10. The truck-side 10 includes a flanged wheel 11 mounted for rotation with an axle 12 which extends into and supports a journal box 13 in bearing relationship.

Figure 2:
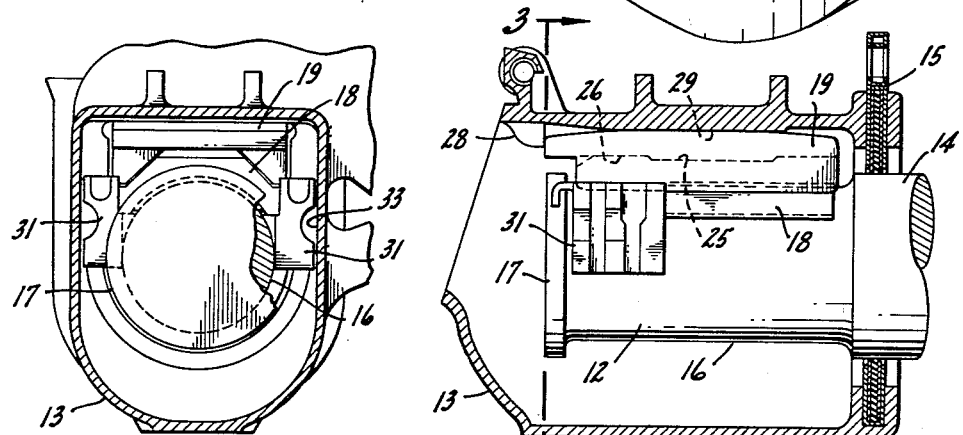
FIGURE 2 is a side elevational view, with the journal box in section, of the journal stop arrangement of FIGURE 1.

Referring for a moment to FIGURE 2, the conventional axle 12 includes a journal hub 14 which cooperates with a journal box oil and dust seal 15 to effectively seal the inner end of the journal box. The seal 15 might be of the type disclosed in the copending application of Robert W. MacDonnell, Serial No. 155,904, filed November 30, 1961, entitled "Seal," now abandoned. The axle 12 also includes an axle journal 16 and a collar 17; the journal 16 supporting the journal box 13 through a conventional bearing member 18 and a wedge 19. The adjacent surfaces 25 and 26 of the bearing member 18 and wedge 19, respectively, are complementarily formed to limit relative movement therebetween. The wedge 19, in turn, is prevented from moving outwardly of the journal box 13 through the access door 27 by a retaining ear 28 integrally formed with the roof 29 of the journal box 13.

Referring again to FIGURE 1, the conventional bearing member 18 freely supports a journal stop arrangement 30 embodying the features of the present invention. The journal stop arrangement 30 limits the longitudinal movement of the axle 12 in the journal box 13. In this regard, it will be understood that longitudinal movement, insofar as railroad terminology is concerned, is movement longitudinally of the railway truck while lateral movement is movement laterally of the truck and consequently of the right of way.

The importance of limiting the longitudinal movement of the axle 12 in the journal box 13 becomes evident during normal humping or braking operations, for example.

During these operations the truck 10 is subjected to severe jolts, the uncontrolled effect of which is to induce longitudinal displacement of the axle in the journal box. This relative longitudinal movement, if not controlled, frequently results in hot boxes and related difficulties caused by journal box packing material catching between a bearing and the axle journal surface. In addition, when such relative movement is permitted to take place, high shock loads are developed between the journal box 13, journal 16, and axle bearing 18. The journal stop arrangement 30 embodying the features of the present invention is effective to forestall hot boxes developed in this manner and substantially reduce the shock loads transmitted between the journal box 13, axle journal 16, and bearing 18.

Still referring to FIGURE 1, it will be seen that the journal stop arrangement 30 includes an opposed pair of journal stop members 31 supported by the conventionally formed, outwardly extending lugs 32 of the bearing member 18. The lugs 32 (one of which is illustrated in dotted lines) are conventionally provided on the bearing member 18 to engage stops (not shown) formed in the side walls 33 of the journal box 13 in a well known manner, and prevent the bearing member 18 from moving out of the journal box 13 in the direction of the oil and dust seal 15.

Figure 3:
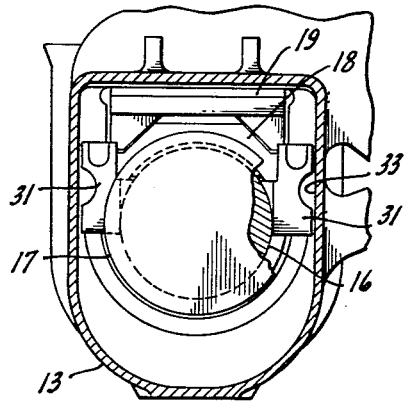
FIGURE 3 is a sectional view taken along line 3—3 of FIGURE 2, with parts removed.

The journal stop members 31 are unitarily formed and are identical in construction, one being the mirror image of the other. Each stop member 31 substantially spans the space between the axle journal 16 and a corresponding inner wall 33 of the journal box 13, as seen in FIGURE 3, to restrict the longitudinal movement of the axle 12 in the journal box. This stabilizes the bearing member 18 and the wedge 19 during humping and braking operations, for example, and prevents them from separating to any substantial degree.

Referring now to FIGURES 4 through 6, an individual journal stop member 31 is shown in detail. Each of the journal stop members 31 preferably comprises a cast manganese bronze block of roughly box-like shape. It should be understood, however, that the stop member 31 might be machined from a larger piece of stock, rather than cast. The manganese bronze alloy has been found to be highly satisfactory because of its strength and wearing qualities but various other alloys having similar characteristics might be utilized.

The inner face 36 of the stop member 31 is divided into a lower, generally planar surface 37 which engages the arcuate surface of the axle journal 16 when the stop member 31 is in operative relationship within a journal box 13, and an upper portion 38 which has a generally arcuate slot 39 cast therein for receiving a corresponding lug 32 on the bearing member 18. Each stop member 31 hangs from a corresponding lug 32, supported by the upper surface 40 of the lug, as seen in FIGURE 6.

Referring to FIGURE 4, the outermost surface 41 of the lug 32 is ramped to conform generally to the arcuate wall 42 of the slot 39 and is normally slightly separated from the arcuate wall. Consequently, the sharp jolts which accompany humping and braking operations, for example, are transmitted directly to the surface 37 of the stop member 31 by the journal section 16, and are not transmitted to the bearing member 18. As a result, the bearing member 18 is not prone to being fractured, for example, by severe shock loads.

The surface 37 of the stop member 31 has a plurality of vertically extending channels 50 formed therein which extend between the upper and lower edge of the surface. These channels 50 act as passages for lubricating oil to travel from the bottom of the journal box 13 to the bearing surface between the bearing member 18 and the axle journal 16. Also, of course, these channels 50 facilitate distribution of lubricating oil over the surface 37 of the stop member 31 to assure lubricated engagement of the journal section 16 with the surface.

The outer face 55 of the stop member 31 has a plurality of lightener cores, seen generally at 56, cast therein for reducing the weight of the stop member without substantially reducing its strength. These cores include a pair of vertically extending depressions 57 and 58, as best seen in FIGURE 4, and a horizontally extending depression 59, as best seen in FIGURE 6. The depressions might be of any configuration, as long as they leave a substantial amount of metal to provide strength to the stop member 31. For example, the vertical depression 57 skirts the slot 39 in the outer face 55 of the member 31, as is best seen in FIGURE 6, while the depressions 58 and 59 do likewise, although they are somewhat deeper than the depression 57. The sole purpose of these depressions is to reduce the weight of the stop member and for that reason, as has been pointed out, their configuration might be varied.

When the stop members 31 are in operative relationship within the journal box 13, a predetermined minimum spacing exists between the surface 37 of each stop member 31 and the arcuate surface of the axle journal 16 when the stop member 31 is flush against a corresponding side wall 33 of the housing 13. This spacing is preferably in the neighborhood of 1/16 of an inch. Consequently, as will readily be understood, the axle 12 is permitted only a total of about 1/8 inch longitudinal movement in the journal box 13 before it is stopped in either direction by one of the journal stop members 31.

The stop members 31 are prevented from moving toward the access door 27 by the collar 17, as best seen in FIGURES 2 and 3. Conversely, they are prevented from moving toward the oil and dust seal 15 by the ramped surface 41 on each lug 32, as is best seen in FIGURE 4. As will be remembered, of course, the bearing lugs 32 conventionally engage stops (not shown) in the walls 33 of the journal box 13 to limit their movement toward the oil and dust seal.

With the journal stop members 31 in operative relationship suspended from the bearing lugs 32, it will be seen that a relatively loose association is maintained between the bearing members 18 and the stop members 31. Because of this loose relationship, shock loads transmitted to the stop members 31 by the axle journal 16 do not develop severely localized stress in the stop members and consequently the danger of fracturing the stop members is virtually non-existent. The situation is somewhat akin to holding an object loosely over an anvil and hitting it against the anvil with a hammer as opposed to placing the object solidly on an anvil first and then hitting it. In the former case, a great deal of the impact energy is dissipated in vibration while in the latter case the impact is so concentrated as to readily fracture the object.

In addition, since the stop members 31 are not rigidly secured to either the bearing member 18 or the journal box 13, obvious weak points in the journal stop arrangement 30 are eliminated. This is true, of course, because the connecting structure in these constructions is a weak link. With the construction embodying the present invention, high stresses which could readily fracture this connecting structure, the journal box 13 itself, or the bearing member 18, and which might be expected with journal stop constructions such as are disclosed in the Pilcher Patent No. 1,967,512 or the Couch Patent No. 2,793,918, for example, are avoided.

To facilitate the insertion and removal of the journal stop members 31, a generally L-shaped handle 65 is provided on each stop member and extends outwardly from its front wall 66. By grasping the handles 65, maintenance personnel can conveniently hold each stop member 31 in position for insertion or removal, as illustrated in FIGURE 8.

Referring now to FIGURE 8, to remove a pair of journal stop members 31 from operative relationship, the journal box 13 is jacked up in a conventional manner by a jack unit 70 of well known construction. When the journal box 13 is jacked up to a sufficient height (relative to the axle 12) such that the upper surface of the wedge 19 is below the retaining ear 28, the wedge is pulled out of the journal box. With the wedge 19 removed, there is considerable space between the bearing member 18 and the roof 29 of the journal box 13 and this permits the bearing member 18 to be tilted upwardly by grasping the handles 65 on the journal stop members 31 and lifting.

When the bearing member 18 has been tilted upwardly to an angle where the stop members 31 can be drawn off of corresponding lugs 32 without engaging the journal collar 17, a wooden wedge 71 is inserted between the bearing member 18 and the axle journal 16. The journal stop members 31 can then be easily slipped off their respective lugs 32 and pulled out of the access door 27 in the journal box 13 while the bearing member is held up by the wooden wedge 71. Removal of the stop members 31 is accomplished, of course, without the maintenance personnel placing their hands in danger within the journal box 13.

At this time new journal stop members 31 embodying the features of the present invention might be inserted to replace worn or damaged stop members, for example. This replacement operation does not require the replacement of the entire bearing member 18, as it does in the case of the construction illustrated in the aforementioned Couch patent, for example, nor does it require special modification of the journal box itself, as required in the construction illustrated in the Pilcher patent, also previously mentioned.

It is conceivable that under some circumstances, however, it might be desirable to remove the bearing member 18 also. This might be the case where the bearing member 18 is substantially worn and replacement is necessary. In such an instance, after the journal box 13 has been jacked upwardly and the wedge 19 removed, the bearing member 18 is tilted upwardly and pulled out with the stop members 31 through the medium of wedging friction developed between the lugs 32 and the slots 39. Sufficient friction is developed by tilting the journal stop members 31 downwardly relative to the bearing member 18 to obtain a wedging effect between the lugs 32 and the slots 39.

The journal stop arrangement 30 embodying the features of the present invention has been described as being utilizable in conventional journal boxes, without modification. It should be understood, however, that conventional journal boxes of various types might vary slightly in construction, even though basically they are substantially identical. For example, certain well known types of journal boxes incorporate waste retaining ribs which act to prevent the rotation of lubricating waste with the rotating axle journal. In contrast, other conventional journal boxes do not contain ribs. The journal stop arrangement embodying the features of the present invention is readily adaptable for utilization with either ribbed or ribless journal boxes.

With the type of conventional journal box 13 which does not incorporate a waste retaining rib (not shown), the journal stop members 31 act as waste retainers and prevent the rotation of lubricating waste. In the case whre a box contains a waste retaining rib on each side wall, the journal stop arrangement 30 might comprise a pair of stop members constructed in the manner shown at 131 in FIGURE 7.

Each journal stop member 131 is substantially identical to the journal stop member 31 described and shown in detail in FIGURES 4 through 6, with the exception that a channel 143 is provided in the lower edge of the stop member to accommodate a waste retaining rib. In addition, the lightener core configuration, as shown generally at 156, might vary slightly, although this is but a matter of choice, and the details of the construction of the depressions forming the lightener cores form no specific part of this invention.

It should be understood that the unitary journal stop members which have been described and which embody the features of the present invention are constructed in such a manner that they are receivable within any conventional journal box presently in use. In addition, no modification of the journal box or the bearing structure associated with the journal box is required to adapt them for utilization of these journal stop members.

The stop members effectively limit longitudinal movement of the axle in the journal box without transmitting high shock loads to either the bearing structure or to the journal box itself. They are loosely mounted relative to the axle journal, the bearing member, and the journal box and consequently do not become damaged easily themselves.

The journal stop members embodying the features of the present invention are simple in construction and relatively inexpensive, in comparison to journal stop constructions presently utilized in the railroad industry. Their utilization results in considerable savings in time and expense insofar as maintenance of the journal box assembly is concerned.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A journal stop for limiting the longitudinal movement of an axle in a journal box relative to a railroad car wherein a bearing having outwardly extending lugs is supported in bearing relationship by an axle journal, said stop comprising a metal member, a slot formed in a portion of one face of said member for receiving one of the bearing lugs, said slot having a substantially horizontally disposed upper wall extending into said member, said wall adapted to normally rest on one of the bearing lugs to support said member in predetermined relationship between the axle journal and an inner wall of the journal box, and a journal engaging bearing surface formed on another portion of said one face.

2. A unitary journal stop for limiting the longitudinal movement of an axle in a journal box relative to a railroad car wherein a bearing having outwardly extending lugs is supported in bearing relationship by an axle journal, said stop comprising a metal member, a horizontal slot formed in a portion of one face of said member for receiving one of the bearing lugs, said slot having a substantially horizontally disposed upper wall extending into said member, said wall adapted to normally rest on one of the bearing lugs to support said member in predetermined relationship between the axle journal and an inner wall of the journal box, a journal engaging bearing surface formed on another portion of said one face, said slot being deep enough so that the outer end of the lug is normally separated from the base of said slot to prevent substantially high impact stresses from being transmitted between said member and the bearing.

3. The journal stop of claim 2 further characterized in that said member is of a predetermined width adapted to substantially span the distance between the axle journal and the inner wall of the journal box while leaving a predetermined spacing therebetween to facilitate rotation of the axle while substantially limiting longitudinal movement thereof.

4. A unitary journal stop for limiting the longitudinal movement of an axle in a journal box relative to a railroad car wherein a bearing having outwardly extending lugs is supported in bearing relationship by an axle journal, said stop comprising a cast metal member, a horizontal slot formed in a portion of one face of said member for receiving a corresponding bearing lug, said slot having a substantially horizontally disposed upper wall extending into said member, said wall adapted to normally rest on one of the bearing lugs to support said member in predetermined relationship between the axle journal and an inner wall of the journal box, a journal engaging bearing surface formed on another portion of said one face, and lubricating channel means formed in said journal engaging bearing surface for permitting the passage of lubricating oil from the bottom of the journal box to the bearing surface between the axle journal and the bearing.

5. The jounal stop of claim 4 further characterized in that said slot is open at one end to facilitate sliding said member onto a corresponding lug, and closed at the opposite end to prevent said member from sliding past the lug.

6. A unitary journal stop for limiting the longitudinal movement of an axle in a journal box relative to railroad car wherein a bearing having outwardly extending lugs is supported in bearing relationship by an axle journal, said stop comprising a cast metal member, a horizontal slot formed in a portion of one face of said member for receiving a corresponding bearing lug, said slot having a substantially horizontally disposed upper wall extending into said member, said wall adapted to normally rest on one of the bearing lugs to support said member in predetermined relationship between the axle journal and an inner wall of the journal box, a journal engaging bearing surface formed on another portion of said one face, and handle means formed in said cast member and extending out of the region of cooperation between the axle journal and the bearing to facilitate insertion of the journal stop into the journal box and removal therefrom without subjecting maintenance personnel to any substantial danger.

7. A unitary journal stop for limiting the longitudinal movement of an axle in a journal box relative to a railroad car wherein a bearing having outwardly extending lugs is supported in bearing relationship by an axle journal, said stop comprising a cast metal member, a horizontal slot formed in a portion of one face of said member, said slot including a substantially horizontally disposed upper wall extending into said member, said slot adapted to receive a corresponding bearing lug wherein said wall of said member rests on the lug to support said member in relatively loose relationship between the axle journal and an inner wall of the journal box, a journal engaging bearing surface formed on another portion of said one face, said member having another face oppositely dispose to said one face, said other face having surfaces adapted to bear against the inner wall of the journal box.

8. The journal stop of claim 7 further characterized in that said other face has depressions formed therein to substantially reduce the weight of the journal stop without substantially reducing its strength.

9. A journal stop comprising a cast metal block, said block being generally box-like in configuration and having a pair of oppositely disposed working faces, a slot formed in the upper portion of one of said faces for receiving support means for the stop, said slot having a substantially horizontally disposed upper wall extending into said block and adapted to rest freely on the support means, a bearing surface formed on a lower portion of said one face, and a force transmitting surface formed on the other face.

10. The journal stop of claim 9 further characterized in that said slot is elongated along the width of said one face.

11. The journal stop of claim 10 further characterized in that said slot is open at one end and closed at the opposite end.

12. The journal stop of claim 10 further characterized in that said slot has a generally arcuate base surface, said base surface curving to form a closed end in one end of said slot, the other end of said slot being open.

13. A journal stop comprising a cast metal block, said block being generally box-like in configuration and having a pair of oppositely disposed working faces, a slot formed in an upper portion of one of said faces, a bearing surface formed on a lower portion of said one face, a force transmitting surface formed on said other face, and a handle formed on said block adjacent said upper portion of said one face and extending generally in the same direction as the plane of said one face.

14. In a railway journal box having an axle journaled therein, the combination of a bearing means, a lug extending from each oppositely disposed end of said bearing means in bracketing relationship with the axle journal, a unitary journal stop member suspended from each of said lugs, said journal stop members adapted to cooperate with the journal box and the axle journal to limit longitudinal movement of the axle journal in the journal box relative to a railroad car.

15. The combination of claim 14 further characterized by and including a slot formed in each of said members in opposed relationship with each other, said lugs extending into said slots and freely suspending said members in operative relationship between the axle journal and journal box.

16. In a railway journal box having an axle extending therein, the combination of a collar on the free end of the axle, a journal section adjacent said collar, a bearing means supported by and engaging said journal section, a lug extending from each oppositely disposed end of said bearing means in bracketing relationship with said journal section, a unitary journal stop member suspended from each of said lugs, said members cooperating with said journal section and the journal box to limit longitudinal movement of the axle in the journal box relative to a railroad car, said members being retained in cooperating relationship with said journal section and the journal box by said collar.

References Cited in the file of this patent

UNITED STATES PATENTS

| | | |
|---|---|---|
| 2,992,865 | Klasing | July 18, 1961 |
| 3,028,202 | George | Apr. 3, 1962 |
| 3,033,616 | Klingler | May 8, 1962 |